United States Patent
Itou

(10) Patent No.: US 9,400,543 B2
(45) Date of Patent: Jul. 26, 2016

(54) COMMUNICATION SYSTEM AND COMMUNICATION NODE

(71) Applicant: DENSO CORPORATION, Kariya, Aichi-pref. (JP)

(72) Inventor: Akito Itou, Kariya (JP)

(73) Assignee: DENSO CORPORATION, Kariya (JP)

(*) Notice: Subject to any disclaimer, the term of this patent is extended or adjusted under 35 U.S.C. 154(b) by 198 days.

(21) Appl. No.: 14/100,099

(22) Filed: Dec. 9, 2013

(65) Prior Publication Data

US 2014/0229753 A1    Aug. 14, 2014

(30) Foreign Application Priority Data

Feb. 13, 2013   (JP) .................................. 2013-25697

(51) Int. Cl.
*G06F 1/32*    (2006.01)
*H04L 12/12*   (2006.01)
*H04L 12/40*   (2006.01)

(52) U.S. Cl.
CPC ............ *G06F 1/3234* (2013.01); *G06F 1/3209* (2013.01); *H04L 12/12* (2013.01); *H04L 12/40039* (2013.01); *H04L 2012/40273* (2013.01); *Y02B 60/32* (2013.01); *Y02B 60/34* (2013.01)

(58) Field of Classification Search
CPC ............... G06F 1/00; G06F 1/04; G06F 1/12; G06F 1/26; G06F 1/32; G06F 11/30; G06F 15/16

See application file for complete search history.

(56) References Cited

U.S. PATENT DOCUMENTS

| 5,751,645 | A | * | 5/1998 | Tsukikawa | .................... 365/194 |
| 5,835,370 | A |   | 11/1998 | Nakamura | |
| 6,611,920 | B1 | * | 8/2003 | Fletcher | .................... G06F 1/04 713/320 |
| 7,030,596 | B1 | * | 4/2006 | Salerno et al. | ................. 323/282 |
| 2005/0144493 | A1 | * | 6/2005 | Cromer et al. | ................. 713/310 |
| 2005/0253861 | A1 | * | 11/2005 | Hutchins | ............... G06F 9/3001 345/561 |
| 2005/0262376 | A1 | * | 11/2005 | McBain | ................. G06F 13/423 713/600 |
| 2007/0143640 | A1 | * | 6/2007 | Simeral | ..................... G06F 1/28 713/320 |
| 2007/0186021 | A1 | * | 8/2007 | Drexler | ............... G06F 13/4295 710/260 |

(Continued)

FOREIGN PATENT DOCUMENTS

JP    2008-132817 A    6/2008
JP    2012-038040 A    2/2012

(Continued)

OTHER PUBLICATIONS

Office Action mailed Dec. 16, 2014 issued in corresponding JP patent application No. 2013-025697 (and English translation).

*Primary Examiner* — Thomas Lee
*Assistant Examiner* — Mohammad A Rahman
(74) *Attorney, Agent, or Firm* — POSZ Law Group, PLC

(57) ABSTRACT

A main body ECU as a slave node includes a switch. The switch is under OFF state when a prohibition signal is outputted from a verification ECU as a master node and under ON state when the prohibition signal is not outputted. The switch is inserted in a reception path between a receive port of a microcomputer of the main body ECU and a receiver of a transceiver that is connected with a communication bus. When the switch is under OFF state, a reception signal outputted by the transceiver is not inputted into the microcomputer of the main body ECU. Therefore, the microcomputer is not activated even if an activation frame is transmitted to the communication bus; this enables the main body ECU to maintain a sleep mode.

20 Claims, 6 Drawing Sheets

(56) References Cited

U.S. PATENT DOCUMENTS

| | | | |
|---|---|---|---|
| 2008/0244260 A1* | 10/2008 | Feldman | H04L 12/66 713/153 |
| 2008/0261530 A1* | 10/2008 | Gerstenberger et al. | 455/63.1 |
| 2010/0048239 A1* | 2/2010 | Kelleher et al. | 455/552.1 |
| 2010/0316099 A1* | 12/2010 | Sugita et al. | 375/219 |
| 2011/0029659 A1* | 2/2011 | Shah | 709/224 |
| 2011/0046844 A1 | 2/2011 | Honner et al. | |
| 2011/0098019 A1* | 4/2011 | Fujii | H04M 1/576 455/411 |
| 2011/0258463 A1* | 10/2011 | Francisco | G06F 1/3234 713/300 |
| 2012/0051241 A1 | 3/2012 | Mori et al. | |
| 2012/0324259 A1* | 12/2012 | Aasheim et al. | 713/320 |
| 2013/0007489 A1* | 1/2013 | Unnikrishnan | G06F 1/3209 713/320 |
| 2013/0103959 A1 | 4/2013 | Hatta | |
| 2013/0179707 A1* | 7/2013 | Osuga | G06F 13/24 713/310 |
| 2014/0042831 A1* | 2/2014 | DiLuciano et al. | 307/328 |
| 2014/0049572 A1* | 2/2014 | Sacchetto | G09G 3/20 345/691 |

FOREIGN PATENT DOCUMENTS

| | | |
|---|---|---|
| JP | 2012-049886 A | 3/2012 |
| JP | 2012-054830 A | 3/2012 |
| JP | 2012-099958 A | 5/2012 |

* cited by examiner

FIG. 2

| CONTROLS | ECU ACTIVATING | ECU ALWAYS NEEDED | ECU TIMELY NEEDED |
|---|---|---|---|
| CHARGE BY EXTERNAL | CHARGE | HV, CHARGE, BATTERY | PARK, VERIFY |
| PRE-AIR CONDITION | VERIFY | VERIFY, HV, AIR-CON, BATTERY, DC-DC | PARK |
| SOLAR CHARGE | SOLAR | VERIFY, HV, BATTERY, SOLAR | PARK |
| HOME-USED BACKUP | CHARGE | HV, CHARGE, BATTERY, DC-DC, ENGINE, MOTOR | PARK, VERIFY |
| DOOR LOCK RELEASE | BODY | VERIFY, PARK, BODY | ---- |

COMMUNICATION SYSTEM AND COMMUNICATION NODE

CROSS REFERENCE TO RELATED APPLICATION

The present application is based on Japanese Patent Application No. 2013-25697 filed on Feb. 13, 2013, the disclosure of which is incorporated herein by reference.

TECHNICAL FIELD

The present disclosure relates to a communication system, which includes a plurality of communication nodes connected mutually via a communication bus, and a communication node in the communication system.

BACKGROUND ART

[Patent Literature 1] JP 2012-54830 A (US 2012/0051241 A)

For example, Patent Literature 1 discloses a communication system to wake up the respective communication nodes that are under a sleep mode. The communication system uses a communication frame that contains an activation pattern area and an assignment pattern area. A subject communication node, which is any one of the plurality of communication nodes, includes a transceiver with an activation frame detection section. When determining a received communication frame as an activation frame directed at the subject communication node itself, the activation frame detection section generates a wake-up signal, thereby permitting a microcomputer of the subject communication node to execute a wake-up process. The received communication frame is determined as an activation frame directed at the subject communication node itself under condition that (i) the activation pattern area contains an activation-used ID having an area length up to a border point, the area length being longer than an activation length, and, simultaneously, (ii) the assignment pattern area contains an assignment code assigned to the subject communication node.

The above activation frame detection section can distinguish whether the received communication frame is an individual or unique activation frame for waking up the subject communication node, even without the use of a highly precise clock source nor a protocol controller. This configuration can reduce the electricity consumption of the subject communication node under the sleep mode, even though the activation frame detection section is constantly under the activated state.

However, the technology disclosed in Patent Literature 1 requires all communication nodes each necessary for wake-up to have the above activation frame detection section. This makes the configuration of each communication node complicated, thereby inevitably increasing costs.

SUMMARY

It is an object of the present disclosure to provide a communication system, which can perform a wake-up of only a communication node necessary for communication without providing a configuration for detecting an individual activation frame, and a communication node included in the communication system.

To achieve the above object, according to a first example of the present disclosure, a communication system is provided as including a plurality of communication nodes that communicate with each other via a communication bus. The communication nodes include at least a first communication node and a second communication node. The first communication node includes a sleep mode and a usual mode as an operation mode, the sleep mode stopping communication via the communication bus to suppress electricity consumption, the usual mode enabling communication via the communication bus. The first communication node under the sleep mode moves from the sleep mode to the usual mode upon receiving an activation frame via the communication bus. The communication system includes a signal line, a prohibition signal output section, and a prohibition section. The signal line is different from the communication bus to connect between the first communication node and the second communication node. The prohibition signal output section is provided in the second communication node to output a prohibition signal to the first communication node being under the sleep mode via the signal line to prohibit the first communication node from moving from the sleep mode to the usual mode. The prohibition section is provided in the first communication node. After receiving the prohibition signal from the second communication node via the signal line, the prohibition section maintains the first communication node under the sleep mode by prohibiting the first communication node from moving from the sleep mode to the usual mode even when the activation frame is transmitted in the communication bus.

Under the above configuration, the prohibition signal output section of the second communication node (i.e., master communication node) outputs the prohibition signal via the signal line, which is dedicated for the first communication node, to the first communication node (i.e., slave communication node) that is under the sleep mode. Thereby, even when an activation frame is transmitted to the communication bus, the prohibition section of the first communication node maintains the first communication node itself under the sleep mode to prohibit the first communication node from waking up. When a predetermined event arises to start subject communication between several communication nodes, the second communication node outputs a prohibition signal to a communication node that is not necessary for participating in the subject communication.

This enables an activation frame to only wake up any communication node that need participate in the subject communication.

The prohibition section of the first communication node is to prevent the first communication node itself from waking up even when an activation frame is transmitted via the communication bus.

For instance, the prohibition section may include a shut-down section that is inserted in a reception path in the first communication node that receives a frame or signal communicated via the communication bus; the shut-down section shuts down the reception path (i.e., the communication in the reception path) depending on reception of the prohibition signal.

Therefore, as compared with an activation frame detection section in Patent Literature 1, the above prohibition section can be realized by a simple configuration and suppress costs.

Further, according to a second example of the present disclosure, a communication node is provided as being included in a communication system that include in addition to the communication node a plurality of other communication nodes that communicate with each other and with the communication node via a communication bus. The communication node includes a sleep mode and a usual mode as an operation mode, the sleep mode stopping communication via the communication bus to suppress electricity consumption, the usual mode enabling communication via the communication bus. The communication node under the sleep mode moves from the sleep mode to the usual mode upon receiving an activation frame via the communication bus. The communication node includes a communication port and a prohibition section. The communication port is connected with a signal line different from the communication bus, the signal line connecting the communication node with a different communication node among the plurality of other communication nodes. The prohibition section maintains the communication node under the sleep mode after receiving the prohibition signal from the different communication node via the signal line, by prohibiting the communication node from moving from the sleep mode to the usual mode even when the activation frame is transmitted in the communication bus.

Yet further, according to a third example of the present disclosure, a communication node is provided as being included in a communication system that include in addition to the communication node a plurality of other communication nodes that communicate with each other and with the communication node via a communication bus. The communication node includes a communication port and a prohibition signal output section. The communication port is connected with a signal line different from the communication bus, the signal line connecting the communication node with a different communication node included in the plurality of other communication nodes. The prohibition signal output section outputs a prohibition signal to the different communication node via the signal line; the prohibition signal prohibits the different communication node under a sleep mode from moving from the sleep mode to a usual mode even when receiving an activation frame via the communication bus. The sleep mode stops communication via the communication bus to suppress electricity consumption, whereas the usual mode enables communication via the communication bus.

The communication nodes according to the second and third examples can configure a communication system according to the first example of the present disclosure.

BRIEF DESCRIPTION OF THE DRAWINGS

The above and other objects, features, and advantages of the present disclosure will become more apparent from the following detailed description made with reference to the accompanying drawings. In the drawings:

FIG. 2 is a diagram illustrating various controls and related ECUs under a stop state of a host vehicle;

DETAILED DESCRIPTION

Figure 1:
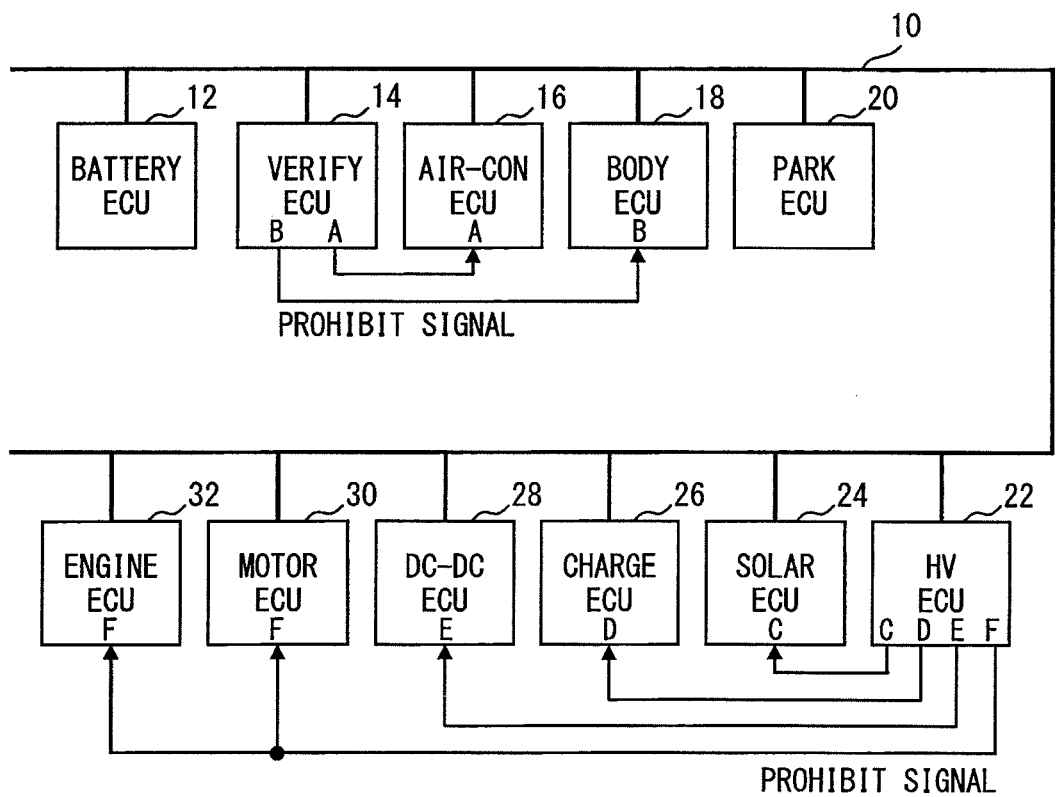
FIG. 1 is a diagram illustrating an overall configuration of a communication system according to an embodiment of the present disclosure.

The following describes an embodiment of the present disclosure with reference to drawings. FIG. 1 illustrates an overall configuration of a communication system according to an embodiment of the present disclosure. For instance, the communication system according to the embodiment uses an in-vehicle LAN (Local Area Network) built in a vehicle such as an automobile. However, the communication system according to the present disclosure is not necessarily limited to the use in a vehicle. For example, the communication system may be applied to a marine vessel, an airplane, a building, a factory, etc.

The communication system according to the present embodiment is applied to a plug-in hybrid vehicle, which may be also referred to as a host vehicle. The plug-in hybrid vehicle includes (i) a driving source of an engine and a motor and (ii) a high voltage battery for driving the motor; the high voltage battery is charged with an external electric power source. With reference to FIG. 1, the plug-in hybrid vehicle includes a plurality of ECUs (Electronic Control Units) 12 to 32 in order to control various kinds of in-vehicle instruments. The ECUs 12 to 32 are mutually connected via a communication bus 10 as an in-vehicle LAN. That is, the ECUs 12 to 32 each serve as a communication node in the communication system of the present embodiment. The following explains the respective ECUs 12 to 32.

The battery ECU 12 calculates a battery residual quantity (SOC: State Of Charge) of the high voltage battery for driving the motor, for instance, based on charging and discharge currents or battery voltage, and performs an equalization process that equalizes the charge states of the respective cells, if included, in the high voltage battery.

The power verification ECU 14 (also referred to as a verification ECU 14) performs reciprocal communication with a portable terminal that is held by a user to thereby execute a predetermined process of verification. Furthermore, when the verification is satisfied or affirmed, the verification ECU 14 permits electric power supply to the various kinds of in-vehicle instruments (for example, a door lock motor, an engine starter, or a compressor and fan of an air-conditioner).

The air-conditioner ECU 16 controls a compressor, a fan, an air mixing door, etc. based on the temperature inside or outside of a vehicle compartment or the amount of insolation so as to keep the vehicle compartment to be around a preset temperature. In addition, when the user manipulates a portable terminal held by the user to request execution of a pre-air conditioning operation before the user gets in the vehicle under the condition that the verification is previously satisfied between the portable terminal and the air-conditioner ECU 16, the air-conditioner ECU 16 activates the air conditioning control before the user gets in the vehicle. This enables the vehicle compartment to be adjusted at a comfortable temperature when the user gets in.

The main body ECU 18 performs a process to release door locking (i.e., a door unlocking process) when a door unlocking switch (i.e., door lock release switch) in a vehicle door is manipulated by the user under a condition that the verification is satisfied in the verification ECU 14. To be specific, a door lock motor is driven in a predetermined direction to release the door lock (i.e., unlock the door). Further, the main body ECU 18 performs a process to lock doors (i.e., a door locking process) when a door locking switch in a vehicle door is manipulated by the user under a condition that the verification is satisfied in the verification ECU 14; namely, the door lock motor is driven in the direction opposite to the direction to unlock, to thereby lock the vehicle door.

The parking control ECU 20 controls electrically actuation of the parking brake. For example, on a condition that the brake pedal is stepped on, the parking control ECU 20 actuates or releases the parking brake depending on the manipulation to the parking switch.

The HV ECU 22 outputs a control signal (target torque) to the motor ECU 30 and the engine ECU 32 for controlling a travel state of the vehicle based on the driver's manipulation to the accelerator pedal or the brake pedal when the ignition switch is turned on. For instance, when the battery residual quantity of the high voltage battery calculated by the battery ECU 12 becomes less than a predetermined lower limit, the HV ECU 22 instructs the motor ECU 30 and the engine ECU 32 so as to contol the vehicle to run only with the engine while the motor is stopped. In contrast, when the battery residual quantity is equal to or greater than the lower limit, the HV ECU 22 instructs the motor ECU 30 to drive the motor using the battery residual quantity of the high voltage battery. Thus, the HV ECU 22 instructs the motor to assist the engine or drive singly the vehicle. That is, the HV ECU 22 determines how to divide a driving torque among the motor and the engine when the driving torque needs to be generated, thereby instructing the motor ECU 30 and the engine ECU 32. Furthermore, at the time of braking the vehicle, the HV ECU 22 instructs the motor to operate as an electric generator, thereby transforming the braking energy into the electrical energy to charge the high voltage battery. In this case, the HV ECU 22 may further output a control signal to a brake ECU, which controls an oil hydraulic brake device, so as to achieve cooperative control with the motor.

The solar ECU 24 controls execution of solar charge while monitoring a power generation state by a solar panel installed in the vehicle, for example. For example, when detecting the state where the power generation by the solar panel is fully performed during the stopping of the vehicle, the solar ECU 24 notifies the HV ECU 22 that the solar charge is possible. At this time, the HV ECU 22 communicates with the battery ECU 12 and the verification ECU 14 and thereby determines whether the battery residual quantity of the high voltage battery is less than a predetermined value or whether the battery residual quantity is expected to fall less than the predetermined value because of the power consumption in the various kinds of in-vehicle instruments. When the battery residual quantity of the high voltage battery is less than the predetermined value or expected to fall less than the predetermined value, the HV ECU 22 controls charging of the high voltage battery using the electric power generated with the solar panel. Then, the solar ECU 24 activates a booster circuit, which transforms or boosts the voltage of the electric voltage generated with the solar panel into the voltage which can charge the high voltage battery, and thereby charges the high voltage battery with the voltage after boosting.

The charge ECU 26 controls the start and the end of a charge/discharge of the high voltage battery when the high voltage battery is charged with an external power source or used as backup power source or emergency power source to supply electric power to homes. For example, when a charge plug is connected to the vehicle, the charge ECU 26 detects that the charge is performed using an external power source, and reports the detection result to the HV ECU 22. When the HV ECU 22 communicates with the battery ECU 12 to check the battery residual quantity for possibility of charge and notifies the charge ECU 26 of the possibility of charge, if determining it. Then, the charge ECU 26 turns on a relay that connects the charge plug to the high voltage battery. Thereby, the charge of the high voltage battery 34 is started. When detecting the full charge state of the high voltage battery during the charge, the charge ECU 26 turns off the relay and ends the charge. In addition, when the electric discharging plug is connected to the vehicle to permit the high voltage battery to serve as a backup power source to supply power, the charge ECU 26 activates an AC inverter and thereby converts the direct current voltage of the high voltage battery into the alternating voltage for home uses to output.

The DC-DC ECU 28 controls the actuation of a voltage conversion circuit (voltage reduction circuit), which converts the high voltage (for example, 200V) generated by the high voltage battery into the low voltage (for example, 12V) for charging the low voltage battery mounted in the vehicle. For example, the DC-DC ECU 28 actuates the voltage conversion circuit based on (i) the battery residual quantity of the low voltage battery and (ii) the battery residual quantity of the high voltage battery, when it is determined that the charge of the low voltage battery is possible and necessary.

The motor ECU 30 controls the actuation of the motor based on a control signal from the HV ECU 22. For example, the motor ECU 30 actuates the motor as an electric motor or an electric generator. In addition, when the motor is actuated as an electric motor, it is controlled to generate a target torque that is specified. The engine ECU 32 controls an operating state of the engine so as to generate a target torque specified from the HV ECU 22.

It is noted that the respective ECUs 12 to 32 are required recently to execute the various kinds of controls even when a host vehicle is under the stop state. FIG. 2 illustrates various controls and related ECUs under the stop state of a host vehicle. For instance, the controls under the stop state of a host vehicle include the following five examples: charge by an external power; pre-air conditioning; solar charge; home-used emergency power source; and smart door unlock.

These controls are executed when a predetermined event arises under the stop state of the vehicle. For example, the control of the charge by an external power is executed when the charge ECU 26 detects that a charge plug is connected. When such control is executed, the charge ECU 26, the battery ECU 12, and the HV ECU 22 are constantly communicated with each other to exchange necessary information or perform cooperative control among the ECUs. Furthermore, each ECU of the parking control ECU 20 and the verification ECU 14 is communicated if needed.

In addition, the control of the pre-air conditioning or the smart door unlock is executed under the follow condition where (i) the verification ECU 14 is activated with time intervals to transmit electric waves for communication with a portable terminal in proximity of the vehicle, and the portable terminal responds to it, and, furthermore, (ii) the user's instruction is made for the execution of the pre-air conditioning using the portable terminal or user's manipulation is made to the door lock release switch, respectively. Similarly, under condition where such control is executed, an ECU constantly necessary for communication and an ECU timely necessary for communication are defined.

Thus, even under the stop state of the vehicle, a subject ECU needs to operate when a control as explained above needs to be executed or when a determination whether to execute the control needs to be made. This prohibits the electric power supply to the respective ECUs 12 to 32 from being thoroughly turned off to move the ECUs 12 to 32 into the stop state.

For instance, the CAN (Controller Area Network) protocol enables the respective ECUs 12 to 32 to move to the sleep mode to stop a communication function for power saving under the condition where the communication bus 10 moves to a recessive level (to be explained below) and then remains in an idle state (i.e., not crowded state) for a predetermined time period. Furthermore, a subject ECU is enabled to designate a specific ECU and instruct the specific ECU to move to the sleep mode.

It is noted that the CAN protocol is adopted with a 2-wire communication line serving as the communication bus 10, in which the two wires are connected with the termination resistors at both ends. A subject ECU, which transmits data, controls a transceiver to generate two kinds of low and high potential differences between the 2-wire communication line to thereby communicate "1" and "0" in the communication bus 10. In this case, the CAN protocol defines the logic "0" as a dominant level (or a dominant) generating the high potential difference in the 2-wire communication line while defining the logic "1" as a recessive level (or a recessive).

It is noted that under a usual CAN protocol, when detecting that the level in the communication bus becomes in the dominant level, any ECU, which has been under the sleep mode, inevitably returns (i.e., transitions) from the sleep mode to the usual mode being an operating mode permitting the communication function. In contrast, as illustrated in FIG. 2, each control only needs a specific ECU necessary for communication among the ECUs; thus, the whole of the ECUs need not be activated always. Therefore, the above measure activating all the ECUs at once unfavorably results in consuming the electric power uselessly. Here, as explained in "BACKGROUND ART", a technology is proposed which can activate each communication node individually. However, such technology needs to increase the cost in the communication nodes.

To that end, the present embodiment provides the following configuration. A master node, which may be referred to as a second communication node or a second node, is predetermined among a plurality of communication nodes. This master node outputs a prohibition signal to a slave node, which may be referred to as a first communication node or a first node, via a signal line different from the communication bus 10 under the condition where this slave node is under the sleep mode. Further, the slave node is provided to include a prohibition section, device, or means; the prohibition section is to permit the slave node itself to remain in the sleep mode even when the communication bus 10 exhibits the dominant level, i.e., when an activation frame, which activates each communication node, is transmitted in or over the communication bus 10. This configuration permits the following when a predetermined event arises to thereby require some communication nodes to perform mutual communication for executing a predetermined control. That is, the master node previously outputs or transmits a prohibition signal to any slave node that need not participate in such mutual communication or the predetermined control. This enables an activation frame to only wake up any communication node that need participate in the mutual communication or the predetermined control.

The following explains a featured configuration of the present embodiment. With reference to FIG. 1, the verification ECU 14 and the HV ECU 22 each are defined as a master node. The air-conditioner ECU 16 and the main body ECU 18 each are defined as a slave node of the verification ECU 14. In addition, the solar ECU 24, the charge ECU 26, the DC-DC ECU 28, the motor ECU 30, and the engine ECU 32 each are a slave node of the HV ECU 22. Thus, the master node is not necessarily limited to a single node in the communication bus 10; more than one communication node can be defined as a master node, individually. Furthermore, more than one slave node can be defined to or for a single master node.

Figure 3:
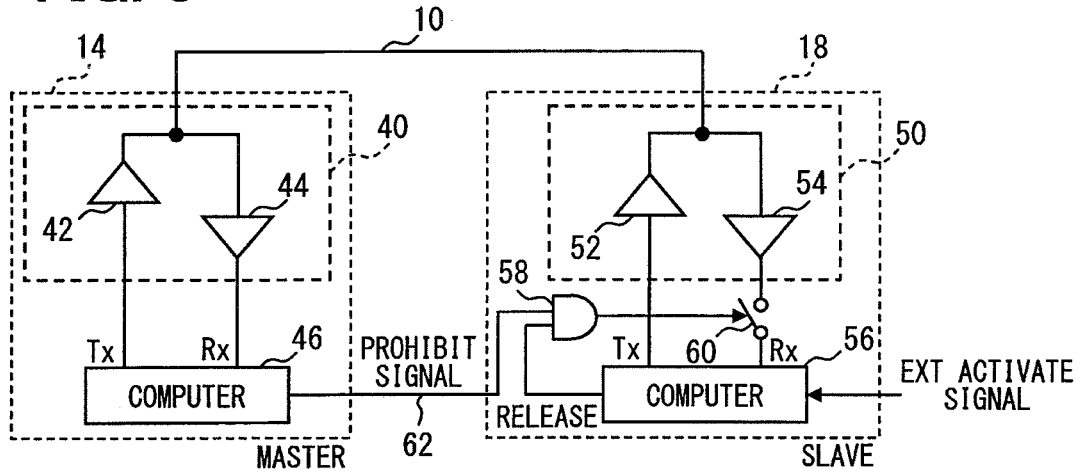
FIG. 3 is a diagram illustrating an overall configuration of a power verification ECU and a main body ECU as examples of a master node and a slave node.

FIG. 3 illustrates an overall configuration of the verification ECU 14 and the main body ECU 18 as examples of a master node and a slave node, respectively.

First, the verification ECU 14 as a master node will be explained. The verification ECU 14 includes (i) a transceiver 40 for communicating with other ECUs via the communication bus 10 and (ii) a microcomputer 46 for executing the various kinds of data processing. The microcomputer 46 has a transmit port Tx connected with a transmitter 42 of the transceiver 40. According to the logical level outputted from the microcomputer 46, the transmitter 42 generates two kinds of high and low potential differences between the 2-wire communication line of the communication line 10 to thereby communicate "0" and "1" in the communication bus 10. The microcomputer 46 has a receive port Rx connected with a receiver 44 of the transceiver 40. The receiver 44 converts the potential difference in the communication bus 10 into the logical level in the microcomputer 46, and outputs it to the receive port Rx of the microcomputer 46.

Similarly to the verification ECU 14, the main body ECU 18 serving as a slave node includes (i) a transceiver 50 containing a transmitter 52 and a receiver 54 and (ii) a microcomputer 56. Furthermore, the main body ECU 18 includes (i) a switch 60 that is inserted in a connection line or path which connects the receiver 54 and the receive port Rx of the microcomputer 56 and (ii) a gate circuit 58 which outputs a switching signal which switches ON/OFF of the switch 60.

In addition, the verification ECU 14 and the main body ECU 18 are communicatively connected using a signal line 62 that is different from the communication bus 10. That is, the signal line 62 is dedicated for communication between the verification ECU 14 and the main body ECU 16. Further, each of (i) the microcomputer 46 of the verification ECU 14 and (ii) the gate circuit 58 of the main body ECU 18 serves as a communication port for the signal line 62. The verification ECU 14 outputs a prohibition signal to the main body ECU 18 via the signal line 62.

The gate circuit 58 receives (i) a prohibition signal from the microcomputer 46 of the verification ECU 14, as explained above, and (ii) a release signal from the microcomputer 56 of the main body ECU 18. The release signal is under the OFF state when the microcomputer 56 is under the sleep mode. When the release signal is under the OFF state, the gate circuit 58 is enabled to output a prohibition signal. In contrast, when the microcomputer 56 is activated, the release signal is turned into the ON state; this prohibits the gate circuit 58 from outputting the prohibition signal.

The switch 60 is under the OFF state while the prohibition signal is outputted from the gate circuit 58, and under the ON state while the prohibition signal is not outputted. When the switch 60 is under the OFF state, a reception signal outputted by the receiver 54 is not inputted into the receive port Rx of the microcomputer 56. Therefore, the main body ECU 18 maintains the sleep mode because the microcomputer 56 is not activated even if an activation frame is transmitted to the communication bus 10. Thus, the gate circuit 58 and the switch 60 cooperatively serve as a prohibition section that prohibits the main body ECU 18 from moving from the sleep mode to the usual mode. Further, the switch 60 serves as a shut-down section to shut down the communication line between the receiver 54 and the receive port Rx of the microcomputer 56.

The microcomputer 56 is provided with a port (also referred to as an external communication port) which receives an external activation signal. For example, a manipulation signal of a manipulation to a door lock release switch provided in a vehicle door is inputted into the microcomputer 56 as an external activation signal. Upon receiving the external activation signal, the microcomputer 56 under the sleep mode needs to execute the control for door lock release (i.e., door unlocking), and therefore returns to the usual mode.

Figure 4:
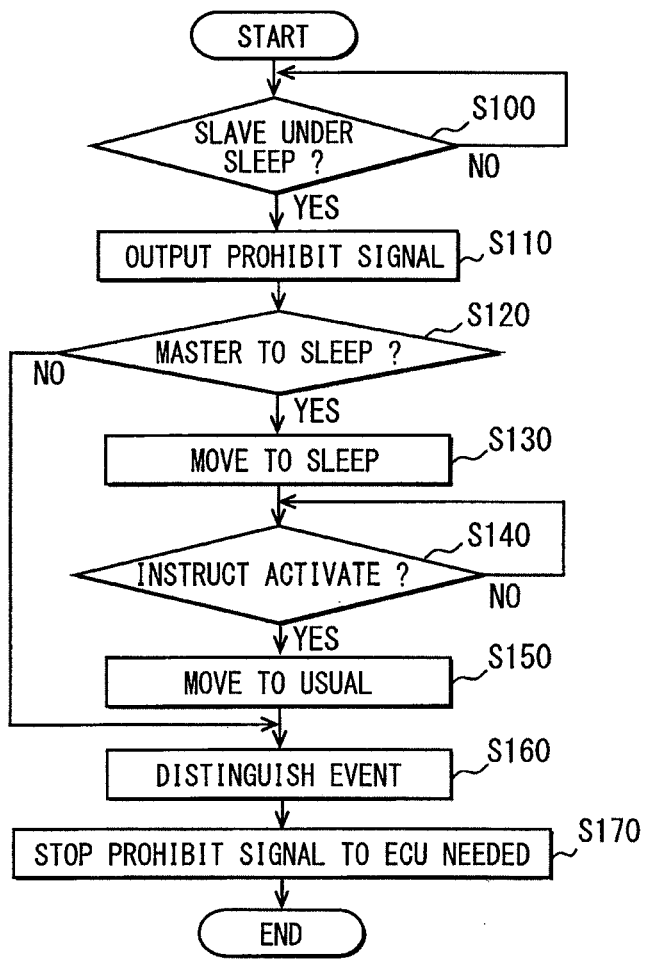
FIG. 4 is a flowchart diagram illustrating a process of controlling an output of a prohibition signal in the power verification serving as a master node.

The following explains a process of the verification ECU 14 serving as a master node with reference to a flowchart in FIG. 4; the verification ECU 14 is to control output of a prohibition signal and stop of the output. The flowchart is assumed to be under the state where the communication bus 10 is under the idle state for a predetermined time period and an ECU serving as a slave node is under the sleep mode. Further, as mentioned above, a master node or another communication node designates one or more than one communication node (i.e., slave node) that does not need to participate in the communication; the master node transmits data which instructs the designated communication node to sleep, thereby enabling the designated communication node to move to the sleep mode. In addition, each ECU may be provided with a specific duration of the idle state of the communication bus 10 until moving to the sleep mode.

It is further noted that a flowchart in the present application includes sections (also referred to as steps), which are represented, for instance, as S100. Further, each section can be divided into several sections while several sections can be combined into a single section. Furthermore, each of thus configured sections can be referred to as a module, device, or means and achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

First, at S100, the microcomputer 46 of the verification ECU 14 determines whether a slave node is under the sleep mode due to the sleep condition being satisfied. When it is determined that the slave node is under the sleep mode, the processing proceeds to S110.

At S110, a prohibition signal is outputted to the slave node. This can prevent the slave node from being activated unconditionally even when an activation frame is transmitted to the communication bus 10. Thus, the microcomputer 46 of the verification ECU 14 may function as a prohibition signal output section. At S120, it is determined whether the verification ECU 14 itself is permitted to move to the sleep mode. When executing any process or needing to communicate with another ECU, the verification ECU 14 is not permitted to move to the sleep mode; thereby, the processing proceeds to S160. In contrast, when the verification ECU 14 is permitted to move to the sleep mode, the processing proceeds to S130, where the verification ECU 14 itself moves to the sleep mode.

At S140, it is determined whether an activation instruction arises or is received. For example, when an activation frame is received from another communication node via the communication bus 10 or when an activation condition is satisfied, for instance, due to an arrival of a transmission period of electric waves for verification, it is determined that the activation instruction arises. Thus, the sleep mode permits only a simple and limited function such as a determination as to whether an activation instruction arises. This can stop the most part of the functions of the communication node, controlling the electricity consumption significantly.

When it is determined that an activation instruction arises at S140, the processing proceeds to S150, where the verification ECU 14 itself returns from the sleep mode to the usual mode. This enables the verification ECU 14 itself to execute the communication with another ECU or the various kinds of control processes. At S160, it is distinguished what kind of an event arises and what kind of a control is to be executed, based on the activation instruction at S140.

For example, when the verification ECU 14 is activated based on an activation frame from another ECU, it is distinguished what kind of an event arises in the vehicle depending on the kind of the ECU which transmitted the activation frame. This is because, as illustrated in FIG. 2, the ECU which transmits an activation frame is predetermined with respect to a specific event arising in the vehicle and its relevant control to be executed.

For instance, when an activation frame is received from the charge ECU 26, it is distinguished that the event arising in the vehicle is a charge or a connection of an discharge plug, and the control to be executed is for charging with an external power source or for supplying emergency power. In this case, the activation frame may contain the data indicating which control is to be executed. Otherwise, the subsequent communication may provide the data indicating which control is to be executed. Further, when an activation frame is received from the main body ECU 18, it is distinguished that the event arising in the vehicle is a user's manipulation to the door lock release switch, and the control to be executed is for releasing the door lock.

At S170, a slave node needing the communication is selected based on the arising event and the control to be executed that are distinguished at S160, and the output of the prohibition signal to the selected slave node is stopped. This enables the selected slave node to be activated when the dominant level is detected in the communication bus 10, and to participate in the communication.

Therefore, the master node performs the process mentioned above, thereby activating only a subject ECU which needs to participate in the communication while keeping other ECU(s) other than the subject ECU, by using such a simple configuration.

Figure 5:
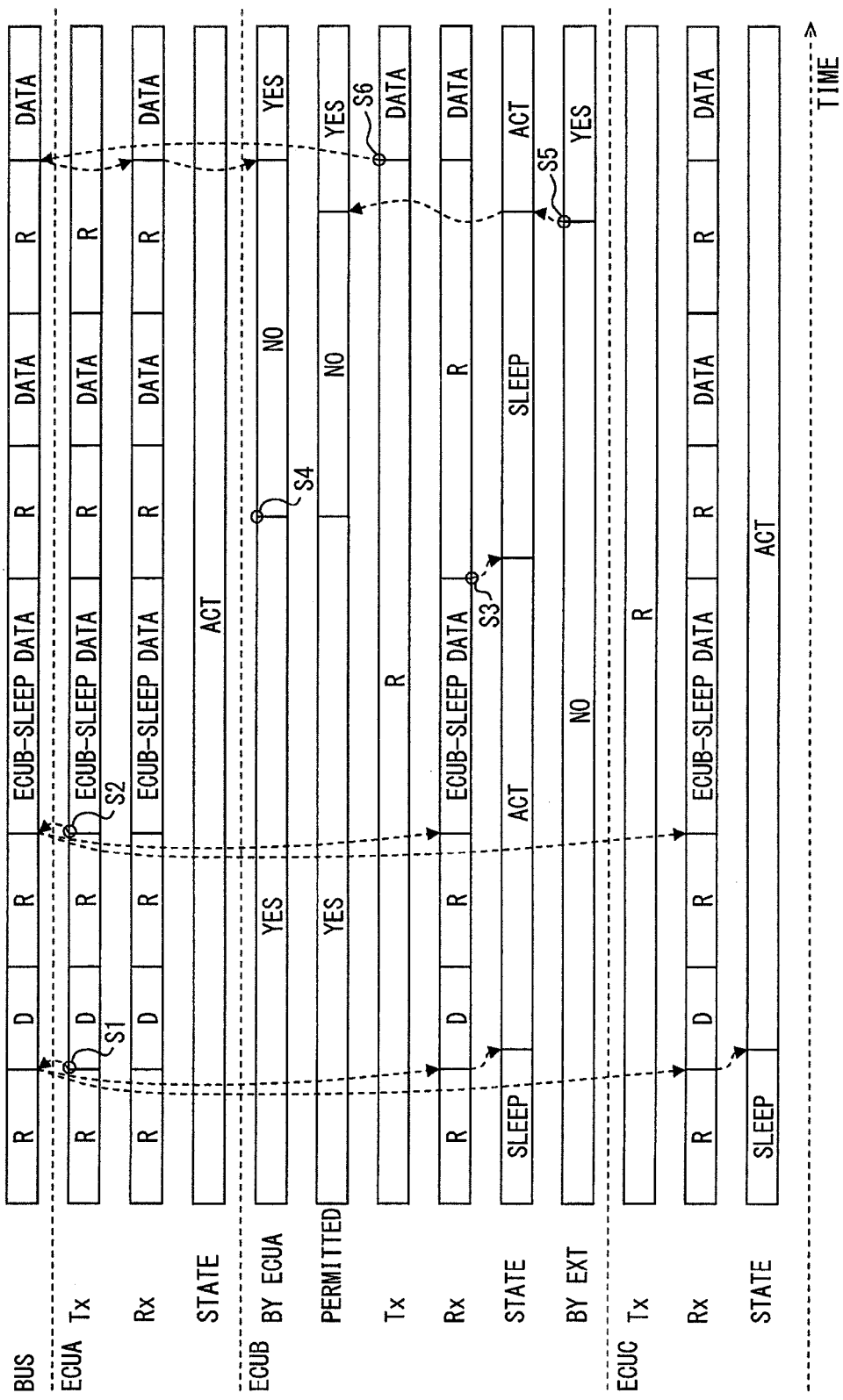
FIG. 5 is a diagram for explaining a first specific example of stopping an output of a prohibition signal from a master node.
Figure 6:
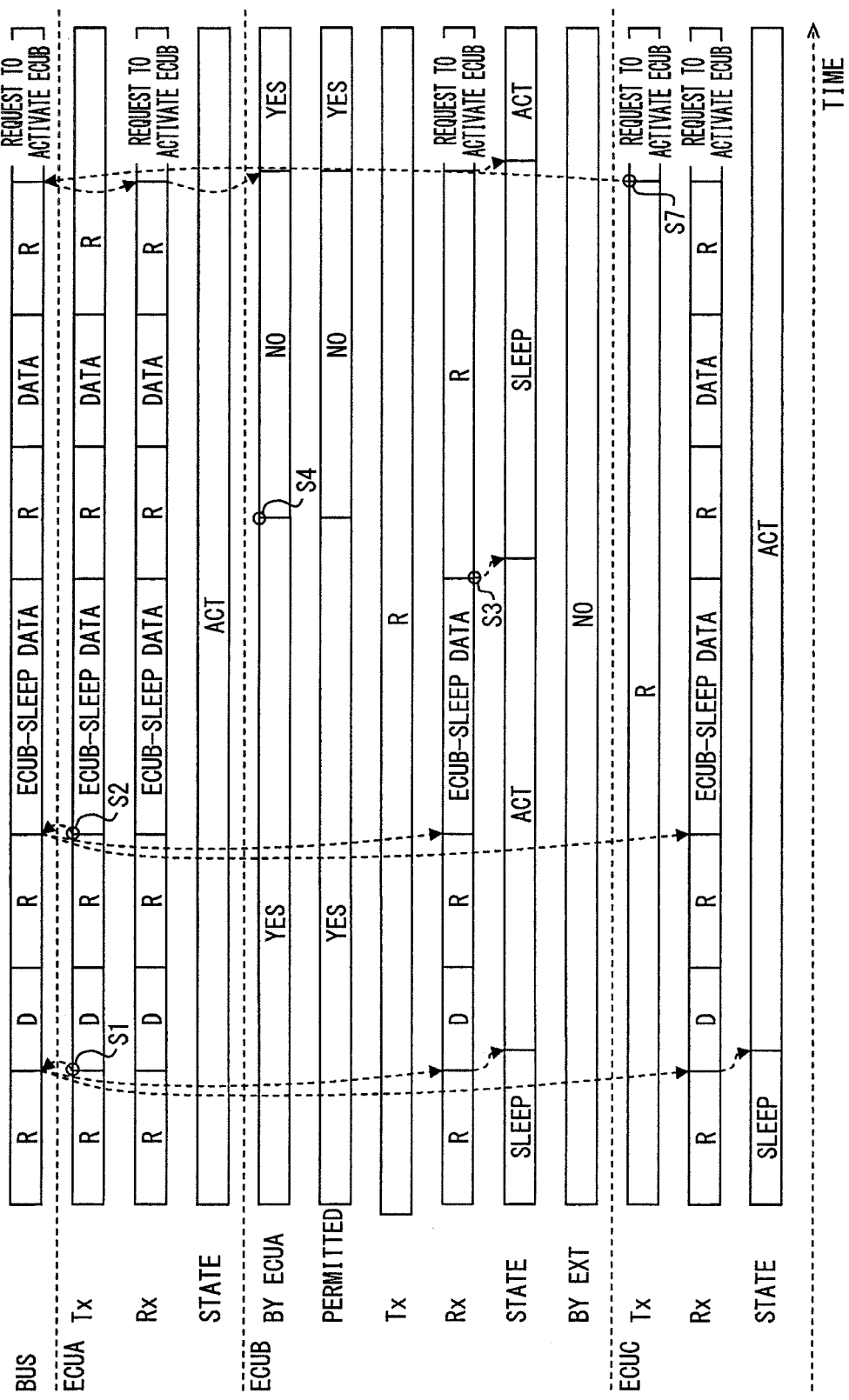
FIG. 6 is a diagram for explaining a second specific example of stopping an output of a prohibition signal from a master node.

The following explains specific examples for a master node to stop the output of a prohibition signal with reference to time-chart diagrams in FIGS. 5 and 6. In FIGS. 5, 6, "BUS" signifies the communication bus 10. "ECUA" signifies a master node. "ECUB" signifies a slave node of ECUA. "ECUC" signifies another communication node other than the slave node that is prohibited by ECUA from being activated.

With reference to FIG. 5, first, ECUA is activated (under the activated state ("ACT")) due to an event that satisfies the activation condition of activating ECUA itself and thereby transmits a dominant ("D") at "S1" (i.e., by replacing a recessive ("R")) to the communication bus 10; this activates other ECUB(s) and ECUC(s) from the sleep mode ("SLEEP") to the activate state ("ACT"). That is, ECUA as a master node does not always output a prohibition signal (outputting a prohibition signal may be referred to as "NO" "BY ECUA" in the row of "ECUB" in FIG. 5) when ECUB as a slave node is under the sleep mode; ECUA is able to output a prohibition signal as needed in consideration of a possibility that ECUB participates in the communication.

Then, from an event arising in the vehicle and a control to be executed, at "S2" ECUA determines that ECUB need not participate in the communication; thereby, ECUA transmits a sleep communication data ("ECUB-SLEEP DATA") that instructs ECUB to move to the sleep mode. Upon receiving the sleep communication data, at 53, ECUB moves from the usual mode to the sleep mode. Furthermore, after ECUB moves into the sleep mode, at S4, ECUA outputs a prohibition signal to ECUB. This enables ECUB to maintain the sleep mode even when a frame containing a dominant (D) is transmitted over the communication bus 10. In FIG. 5, "DATA" signifies a communication data that contains a dominant.

After the prohibition signal is outputted to ECUB, an external activation signal becomes active (from "NO" to "YES") at "S5"; this enables ECUB to move to the activated state regardless whether ECUA outputs a prohibition signal to ECUB (from "NO" to "YES" in "PERMITTED" in the row of "ECUB"). Thereby, ECUB is activated (from "SLEEP" to "ACT"). In this case, at "S6", ECUB transmits a communications data (activation frame "DATA") which notifies other ECUs that ECUB itself is activated. Then, upon receiving the communications data from ECUB, ECUA recognizes that ECUB is activated. This condition no longer requires ECUA to continue outputting the prohibition signal to ECUB; ECUA thus stops outputting of the prohibition signal for ECUB ("NO" to "YES" "BY ECUA" in the row of "ECUB" in FIG. 5). Furthermore, ECUA stops outputting a prohibition signal for each ECU that is needed to participate in the communication when ECUB activates to execute a control.

Thus, even in cases that ECUB receives a prohibition signal that is outputted to ECUB itself, ECUB can be activated when the activation condition of ECUB itself is satisfied, e.g., by receiving an external activation signal. Such a case can also control the master node to stop outputting the prohibition signal. When ECUB is activated, the microcomputer of ECUB turns on a release signal to the gate circuit 58. Then, any prohibition signal is no longer outputted from the gate circuit 58, and the switch 60 is turned on. This enables ECUB to receive a signal in the communication bus 10 even when or regardless of whether a prohibition signal is outputted by ECUA.

Next, FIG. 6 illustrates another example where ECUC outputs a request to activate ECUB ("REQUEST TO ACTIVATE ECUB"), thereby controlling ECUA to stop outputting of the prohibition signal for ECUB. For example, under the state where ECUB is in the sleep mode, ECUC may determine that the communication with ECUB is necessary for executing a predetermined control. In such a case, ECUC outputs or provides a request to activate ECUB to ECUA at "S7". Herein, the request to activate ECUB may function as a communication trigger signal. Upon receiving the request of activation, ECUA stops outputting of the prohibition signal for ECUB (from "NO" to "YES" "BY ECUA"). This activates ECUB based on the reception of the request to activate ECUB.

Thus, a communication node other than a master node may determine whether to activate another communication node, which is receiving a prohibition signal to thereby remain under the sleep mode.

The embodiment of the present disclosure is thus described; however, without being restricted to the embodiment mentioned above, the present disclosure may be variously modified as long as not deviating from the scope thereof.

Figure 7:
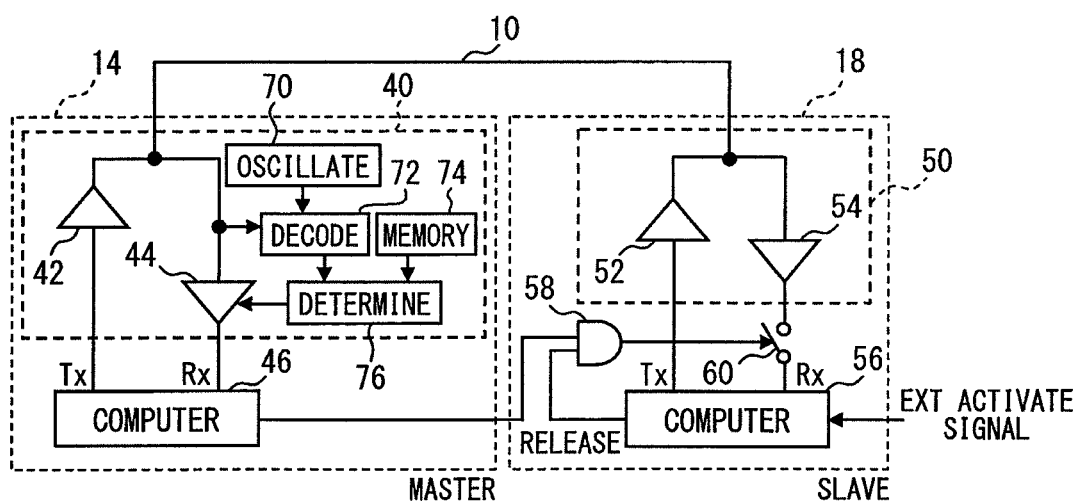
FIG. 7 is a diagram illustrating an overall configuration of a master node and a slave node according to a modification example of the embodiment.

For instance, the above embodiment provides an example where the transmission of a dominant to the communication bus 10 controls a communication node other than a slave node to move from the sleep mode to the usual mode. This configuration may be modified as shown in FIG. 7. That is, a subject communication node excluding a slave node but including a master node may be provided with an individual activation frame detection section that generates a wake-up signal by identifying an individual activation frame directed at the subject communication itself.

With reference to FIG. 7, the individual activation frame detection section includes an oscillating circuit 70, a decoder 72, a memory 74, and a determination section 76. The decoder 72 decodes a potential difference on the communication bus 10 into a decoded signal, and outputs the decoded signal to the determination section 76. The memory 74 stores previously an identification code for identifying the subject communication node itself. The determination section 76 permits the output by the receiver 44 when the decoded signal matches the stored identification code.

The above individual activation frame detection section is not provided to each of all the communication nodes; this still reduces the cost as compared with a conventional configuration.

Further, in the above embodiment, the switch 60 is inserted in a connection line which connects the receiver 54 and the receive port Rx of the microcomputer 56. Alternatively, the switch may be inserted in a connection line between the receiver 54 and the communication bus 10.

Furthermore, instead of providing such a switch, another switching configuration may be provided which switches between an active state and an inactive state, for instance, by turning an operation power of the receiver 54 between the ON state and OFF state.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A communication system comprising:
a communication bus;
a plurality of communication nodes including at least three communication nodes that are a first communication node, a second communication node, and another communication node,
the plurality of communication nodes being enabled to communicate with each other via the communication bus,
the first communication node including a sleep mode and a usual mode as an operation mode, the sleep mode stopping communication via the communication bus to suppress electricity consumption, the usual mode enabling communication via the communication bus,
the first communication node under the sleep mode moving from the sleep mode to the usual mode upon receiving an activation frame via the communication bus; and
a signal line that is different from the communication bus, the signal line connecting between the first communication node and the second communication node to transmit a subject signal from the second communication node to the first communication node,
wherein:
the second communication node includes a prohibition signal output device outputting a prohibition signal, as the subject signal via the signal line, to the first communication node that is under the sleep mode to prohibit the first communication node from moving from the sleep mode to the usual mode; and
the first communication node includes a prohibition device prohibiting the first communication node from moving from the sleep mode to the usual mode upon receiving the prohibition signal from the second communication node via the signal line, by maintaining the first communication mode under the sleep mode even when the activation frame is transmitted in the communication bus.

2. The communication system according to claim 1, wherein:
the first communication node is enabled to receive an external activation signal from an external source without using the communication bus;
upon receiving the external activation signal, the first communication node moves from the sleep mode to the usual mode while releasing a prohibition state where the first communication node is prohibited from moving from the sleep mode to the usual mode even when the activation frame is transmitted in the communication bus.

3. The communication system according to claim 2, wherein:
after moving to the usual mode upon receiving the external activation signal, the first communication node transmits the activation frame to the communication bus; and
upon receiving the activation frame via the communication bus from the first communication node that the second communication node prohibits from moving to the usual mode by outputting the prohibition signal, the second communication node stops outputting the prohibition signal to the first communication node.

4. The communication system according to claim 1, wherein:
the plurality of communication nodes include a plurality of the first communication nodes;
the prohibition signal output device of the second communication node outputs the prohibition signal to the first communication nodes;
the plurality of communication nodes includes a subject communication node that is activated by an external activation signal from an external source to thereby provide a communication trigger signal to start a subject communication;
when the subject communication is started due to the communication trigger signal, the prohibition signal output device of the second communication node selects any one of the first communication nodes as being necessary for the subject communication depending on which communication node is activated and thereby provides the communication trigger signal; and
the prohibition signal output device then stops outputting the prohibition signal to any one of the first communication nodes that is selected.

5. The communication system according to claim 1, wherein:
the plurality of communication nodes includes a predetermined communication node that is enabled to communicate with the second communication node during a duration in which the prohibition signal output device of the second communication node outputs the prohibition signal to the first communication node;
the predetermined communication node transmits a prohibition release signal to the second communication node when needing to communicate with the first communication node; and
upon receiving the prohibition release signal from the predetermined communication node, the prohibition signal output device of the second communication node stops outputting the prohibition signal to the first communication node.

6. The communication system according to claim 1, wherein
the prohibition device of the first communication node includes a shut-down device that is inserted in a reception path in the first communication node that receives a signal communicated via the communication bus, the shut-down device shutting down the reception path depending on reception of the prohibition signal.

7. The communication system according to claim 1, wherein:
the second communication node includes as an operation mode the sleep mode and the usual mode; and
the second communication node includes an individual activation device that controls the second communication node to move from the sleep mode to the usual mode when determining that an individual activation frame is directed to the second communication node itself when the second communication node under the sleep mode receives the individual activation frame, the individual activation frame being to activate individually a communication node serving as a target of activation from the sleep mode to the usual mode.

8. The communication system according to claim 1, wherein
the signal line permits one to one electrical connection between the first communication node and the second communication node to dedicatedly transmit the prohibition signal directly from the second communication node to the first communication node.

9. The communication system according to claim 1, wherein;
communication via the communication bus is compliant with a predetermined communication protocol of a local area network; and
communication via the signal line is non-compliant with the predetermined protocol.

10. A first communication node included in a communication system that includes a plurality of communication nodes including at least two other communication nodes in addition to the first communication node, the plurality of communication nodes communicating with each other via a communication bus, the first communication node including a sleep mode and a usual mode as an operation mode, the sleep mode stopping communication via the communication bus to suppress electricity consumption, the usual mode enabling communication via the communication bus, the first communication node under the sleep mode moving from the sleep mode to the usual mode upon receiving an activation frame via the communication bus,
the first communication node comprising:
a communication port connected with a signal line that is different from the communication bus, the signal line connecting the first communication node with a different communication node among the plurality of communication nodes, the signal line being used to transmit a subject signal from the different communication node to the first communication node; and
a prohibition device prohibiting the first communication node under the sleep mode from moving to the usual mode even when the activation frame is transmitted in the communication bus, upon receiving a prohibition signal, as the subject signal via the signal line, from the different communication node, the prohibition signal prohibiting the first communication node from moving from the sleep mode to the usual mode.

11. The first communication node according to claim 10, further comprising:
an external communication port to receive an external activation signal from an external source without using the communication bus,
wherein
upon receiving the external activation signal, the operation mode moves from the sleep mode to the usual mode and a prohibition state is released, the prohibition state being a state where the prohibiting device prohibits the operation state from moving from the sleep mode to the usual mode.

12. The first communication node according to claim 10, wherein
the prohibition device includes a shut-down device that is inserted in a reception path that receives a signal communicated via the communication bus, the shut-down device shutting down the reception path depending on reception of the prohibition signal.

13. The first communication node according to claim 10, wherein
the signal line permits one to one electrical connection between the first communication node and the different communication node to dedicatedly transmit the prohibition signal directly from the different communication node to the first communication node.

14. The first communication node according to claim 10, wherein;
communication via the communication bus is compliant with a predetermined communication protocol of a local area network; and
communication via the signal line is non-compliant with the predetermined protocol.

15. A first communication node included in a plurality of communication nodes in a communication system, the plurality of communication nodes including at least two other communication nodes in addition to the first communication node, the plurality of communication nodes communicating with each other via a communication bus,
the first communication node comprising:
a communication port connected with a signal line that is different from the communication bus, the signal line connecting the first communication node with a different communication node among the plurality of communication nodes, the signal line being used to transmit a subject signal from the first communication node to the different communication node; and
a prohibition signal output device outputting a prohibition signal to the different communication node, as the subject signal, via the signal line,
the prohibition signal prohibiting the different communication node under a sleep mode from moving from the sleep mode to a usual mode even when receiving an activation frame is via the communication bus,
the sleep mode stopping communication via the communication bus to suppress electricity consumption,
the usual mode enabling communication via the communication bus.

16. The first communication node according to claim 15, wherein:
the plurality of communication nodes include a plurality of the different communication nodes;
the plurality of different communication nodes include a subject communication node that is activated from the sleep mode by an external activation signal from an external source to thereby provide a communication trigger signal to start a subject communication;
the prohibition signal output device of the first communication node outputs the prohibition signal to the plurality of the different communication nodes;
when the subject communication is started due to the communication trigger signal, the prohibition signal output device of the first communication node selects any one of the different communication nodes as being necessary for the subject communication, according to which first communication node is activated and thereby provides the communication trigger signal; and
the prohibition signal output device then stops outputting the prohibition signal to any one of the different communication nodes that is selected.

17. The first communication node according to claim 15, including the sleep mode and the usual mode as an operation mode,
the first communication node further comprising:
an individual activation device that controls the first communication node itself to move from the sleep mode to the usual mode when determining that an individual activation frame is directed to the first communication node itself when the communication node itself under the sleep mode receives the individual activation frame, the individual activation frame being to activate individually a different communication node serving as a target of activation from the sleep mode to the usual mode.

18. The first communication node according to claim 15, wherein:
the plurality of communication nodes includes a predetermined communication node that is enabled to communicate with the first communication node during a duration in which the prohibition signal output device of the first communication node outputs the prohibition signal to the different communication node;
the predetermined communication node transmits a prohibition release signal to the first communication node when needing to communicate with the different communication node; and
upon receiving the prohibition release signal from the predetermined communication node, the prohibition signal output device of the first communication node stops outputting the prohibition signal to the different communication node.

19. The first communication node according to claim 15, wherein
the signal line permits one to one electrical connection between the first communication node and the different communication node to dedicatedly transmit the prohibition signal directly from the first communication node to the different communication node.

20. The first communication node according to claim 15, wherein;
communication via the communication bus is compliant with a predetermined communication protocol of a local area network; and
communication via the signal line is non-compliant with the predetermined protocol.

* * * * *